June 4, 1935. F. GELSTHARP ET AL 2,003,289
PROCESS FOR MAKING PLATE GLASS
Filed June 30, 1933 6 Sheets-Sheet 3
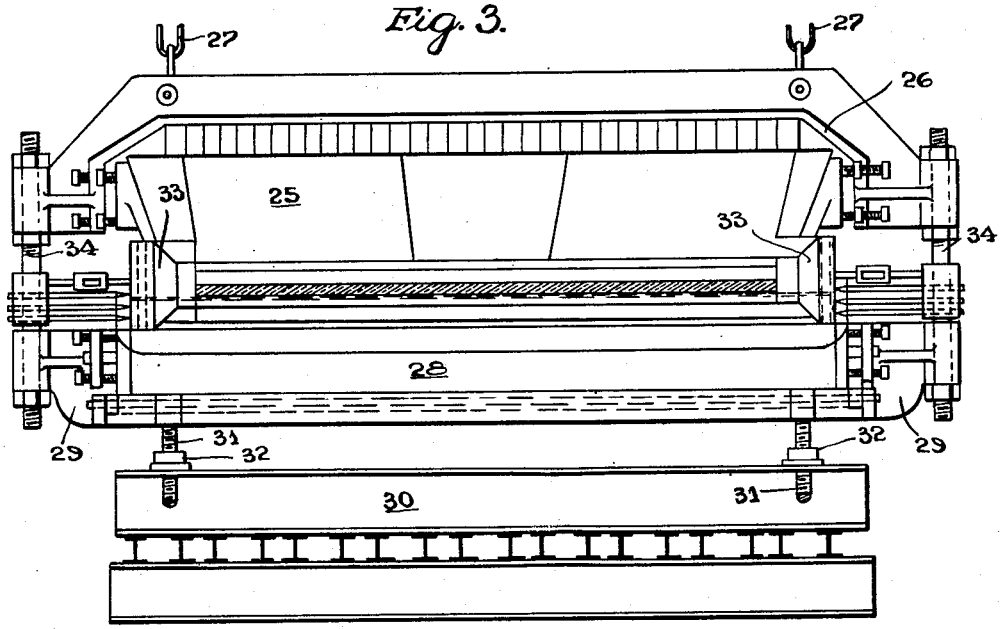
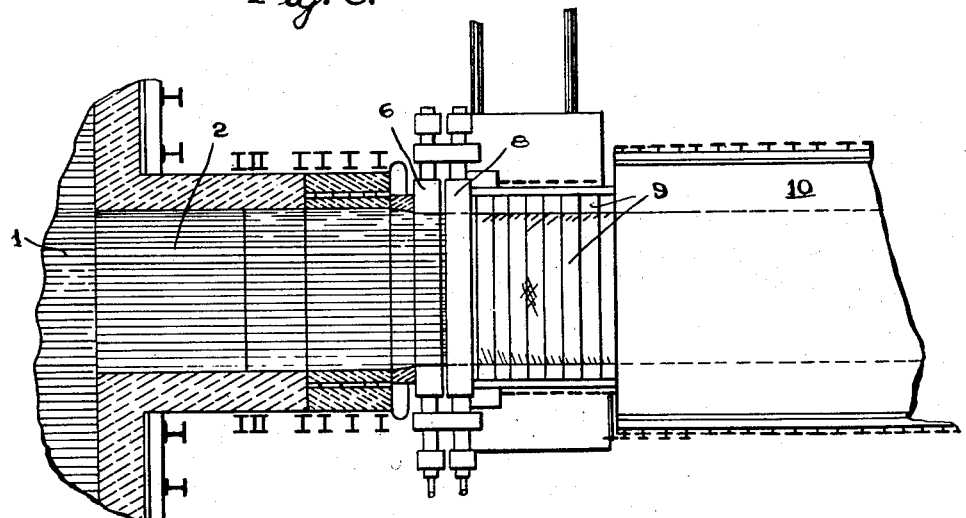
INVENTORS
FREDERICK GELSTHARP AND
WALTER G. KOUPAL.
BY
ATTORNEYS

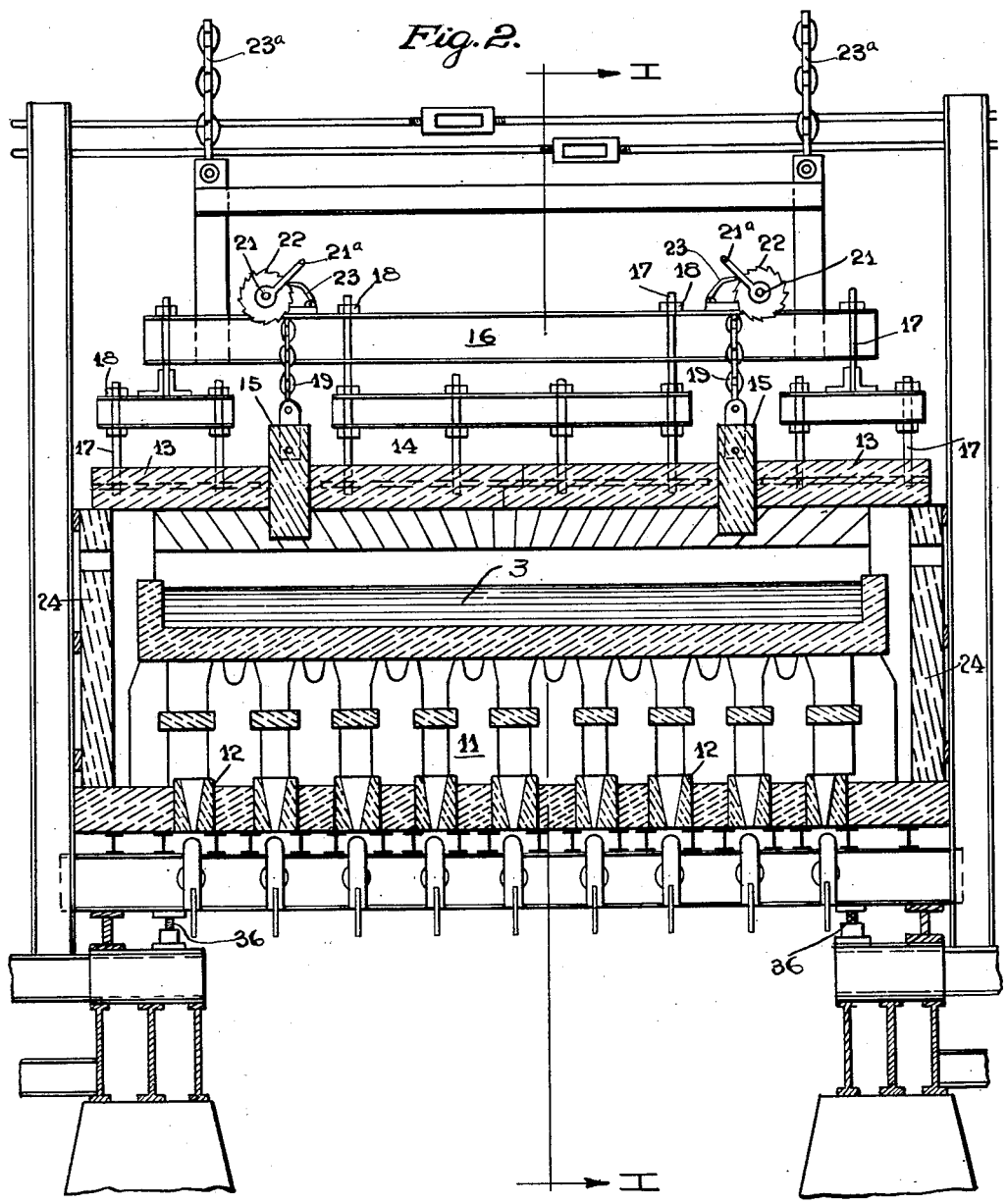

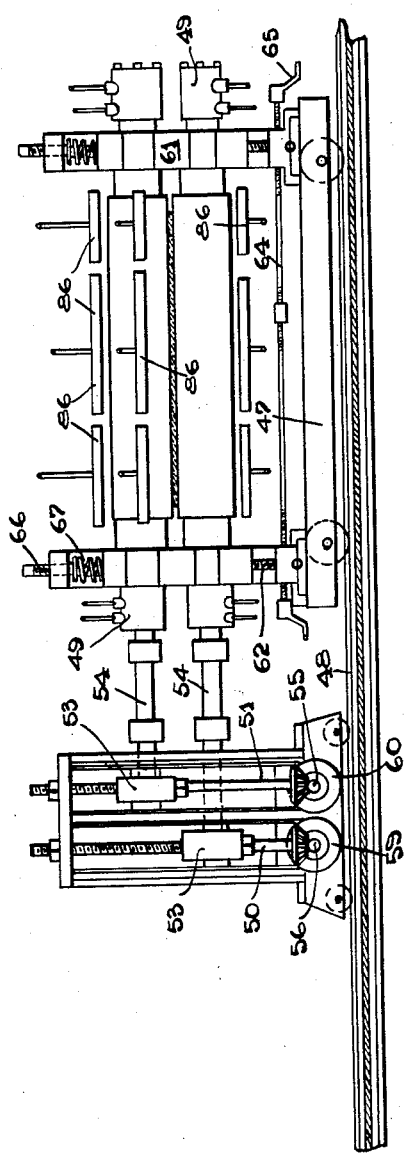

June 4, 1935. F. GELSTHARP ET AL 2,003,289
PROCESS FOR MAKING PLATE GLASS
Filed June 30, 1933 6 Sheets-Sheet 5
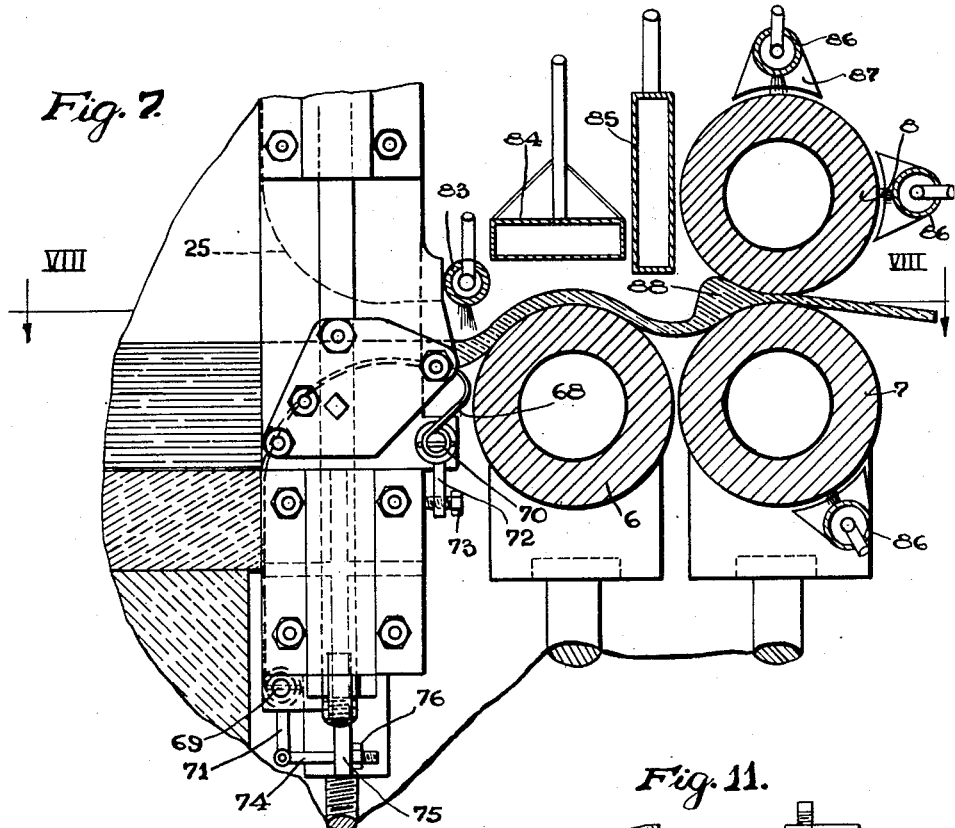
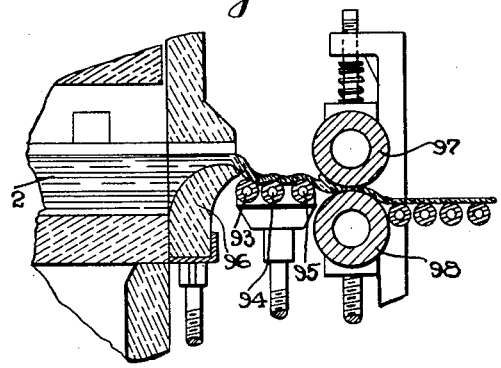
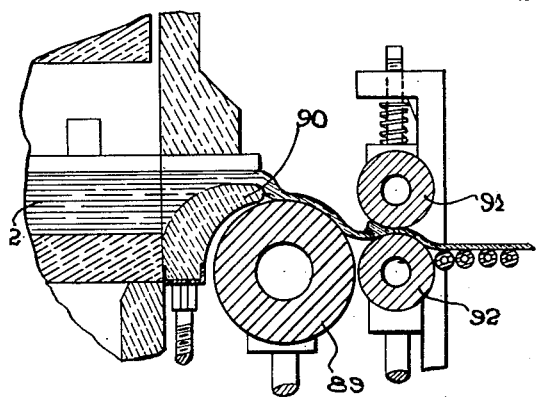
INVENTORS
FREDERICK GELSTHARP AND
WALTER G. KOUPAL.
BY
ATTORNEYS June 4, 1935.   F. GELSTHARP ET AL   2,003,289
PROCESS FOR MAKING PLATE GLASS
Filed June 30, 1933   6 Sheets-Sheet 6

INVENTORS
FREDERICK GELSTHARP AND
WALTER G. KOUPAL.
BY
ATTORNEYS

Patented June 4, 1935

2,003,289

UNITED STATES PATENT OFFICE 2,003,289

PROCESS FOR MAKING PLATE GLASS

Frederick Gelstharp and Walter G. Koupal, Tarentum, Pa., assignors to Pittsburgh Plate Glass Company, a corporation of Pennsylvania Application June 30, 1933, Serial No. 678,430

6 Claims. (Cl. 49—33)

The invention relates to a process for making plate or sheet glass, and involves certain improvements over the process and apparatus described in United States Letters Patent No. 1,598,770, dated September 7, 1926. It has for its principal object the provision of a process in which a more uniform feed is secured from the supply roll of the apparatus to the sizing rolls with a minimum amount of chilling in the passage of the sheet from the supply roll to the sizing rolls. In arriving at this result, the apron or runway of said patent is dispensed with, so that the sheet is free to sag and stretch uniformly without interference after it passes the supply roll, and the sizing rolls are brought in close proximity to the supply roll, so that the chilling and hardening of the sheet before it reaches the sizing rolls is reduced to a minimum. This is increasingly important in producing a thin sheet. A further distinction over the patent in the matter of operation consists in independently regulating the relative speed of rotation of the supply and sizing rolls in such manner that a bulb or roll of soft glass is constantly maintained at the entrance of the pass between the sizing rolls. The excess of glass thus supplied serves to keep the pass filled with glass from end to end, even though substantial variations occur in the thickness of the sheet (from edge to edge) supplied to the sizing rolls since the bulb or roll of glass tends to flow endwise and supply any deficiency which might otherwise occur in the layer of soft glass.

Another object of the invention is the provision of regulating means for the outlet lip of the draw pot and for the supply roll to insure a uniform thickness from edge to edge of the sheet passing over such roll.

Figure 1:
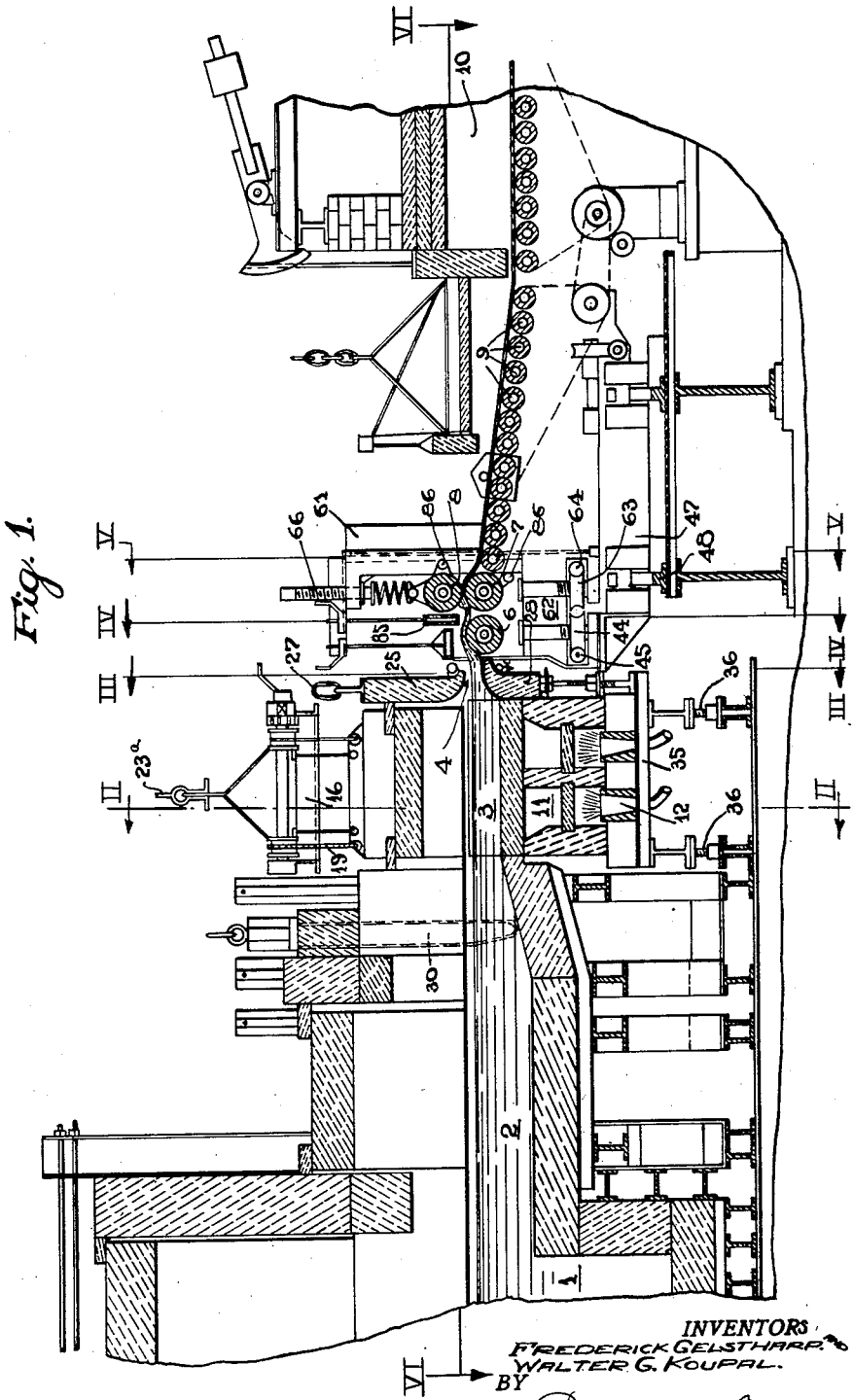
Figure 8:
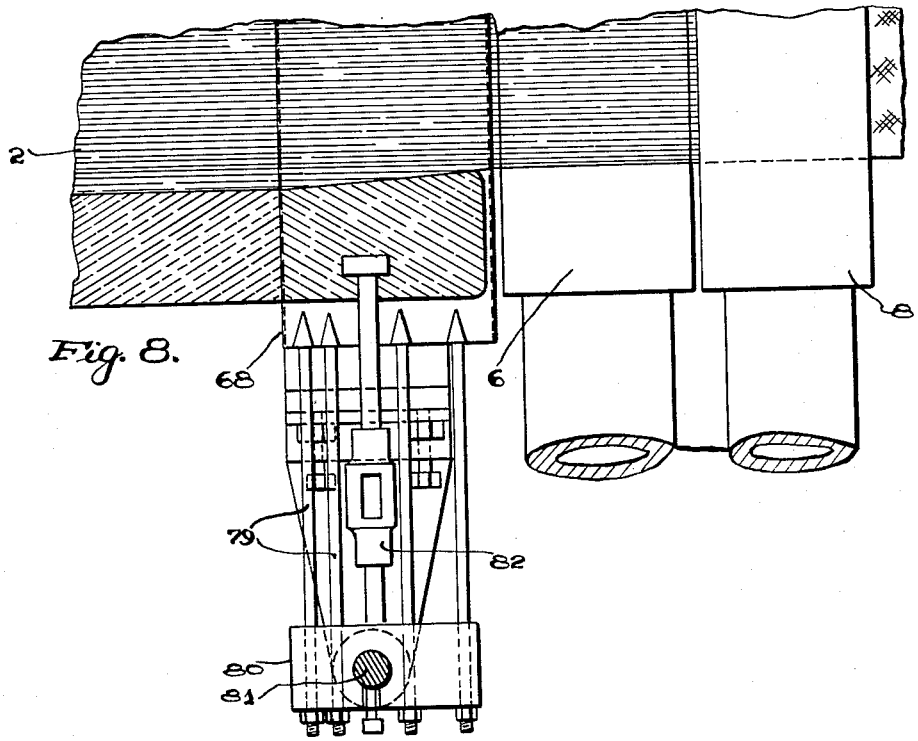
Figure 9:
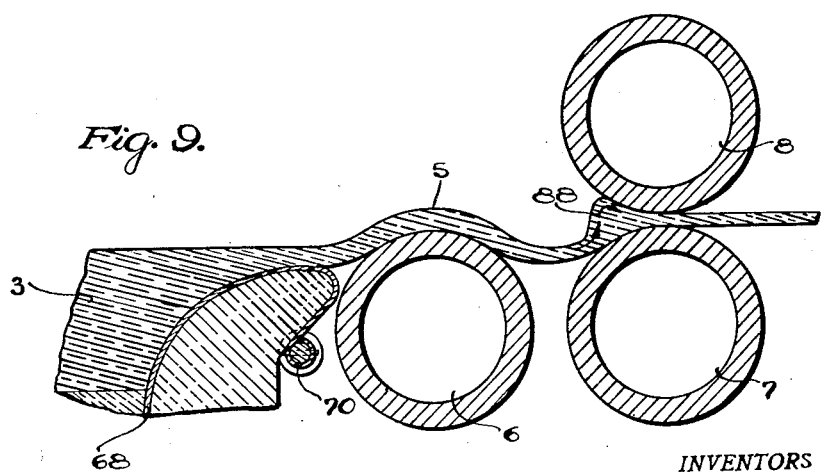

Certain embodiments of the improved apparatus for practicing the process are shown in the accompanying drawings, wherein:

Figure 1 is a section through the preferred form of apparatus on the line I—I of Fig. 2. Figs. 2 to 6 are sections on the lines II—II to VI—VI respectively of Fig. 1. Fig. 7 is a partial side elevation and partial section on an enlarged scale. Fig. 8 is a section on the line VIII—VIII of Fig. 7. Fig. 9 is an enlarged detail section. And Figs. 10 and 11 are sections through modified constructions.

Referring to the drawings, 1 is a melting tank; 2 is a cooling chamber of less depth than the tank; and 3 is a draw pot or forehearth having an outlet slot 4 at its forward end, through which the glass is discharged in the form of a sheet 5, such sheet being first carried over the feed roll 6, and between the sizing rolls 7, 8. The sheet then passes over the runway rolls 9 and into the roller leer 10.

The draw pot 3 is mounted above heating flues 11, to which gas is supplied by means of the burners 12, as shown in Figs. 1 and 2. The cover of the pot consists of the three roof sections 13, 13 and 14 (Fig. 2) and the two shade members 15, 15. The side sections 13, 13 are suspended from the frame 16 by means of the rods 17, and their relative vertical positions may be adjusted by means of the nuts 18. The shade members 15 are also independently adjustable by means of the chains 19 passing over drums 20 on the shafts 21, such shafts being provided with handles 21a and ratchets 22 engaged by pawls 23, whereby the members may be held in adjusted position. The entire top is supported by means of chains 23a which may be moved up and down by suitable mechanism, such as a crane, not shown, for purposes of adjustment or for removal and replacement. When the side sections are adjusted above the position shown in Fig. 2, the spaces left between the members and the side walls 24, 24 may be filled in with refractory blocks of the necessary thickness. The central portion of the bath in the pot ordinarily runs hotter than the sides, and in order to bring the glass to uniform temperature across the width of the pot, the central section 14 may be raised somewhat. This adjustment, combined with an adjustment of the shade members 15, thus provides a means for equalizing the temperature of the bath. The shade members obstruct the flow of heated gases which sweep across the bath from the sides to the center thereof, so that their use keep the glass at the center of the pot at a lower temperature than would otherwise be the case. This is desirable either in the production of a sheet by a rolling operation, as illustrated in the present application, or in those cases in which a sheet is drawn vertically from a pot in the manufacture of window glass, and it will be understood that this top construction is not limited to use in connection with the particular sheet forming means shown in the present application.

The front wall of the pot comprises the upper member 25 and includes a metal frame 26. This frame is provided with supporting chains 27 connected to an overhead crane (not shown) and by means of which the front wall may be brought to position and removed when this becomes necessary. This upper member is made up of blocks clamped in the frame 26, as indicated in Fig. 3.

The lower, or lip member 28, is also made up of blocks carried in a metal frame 29 (Fig. 3) and supported from the underframing channel 30 by means of the two threaded rods 31. By rotating the nuts 32, which rest on the channel 30, the lip may be adjusted up and down, depending on the depth of glass desired above the lip or to entirely cut off the flow of glass if desired. The lip may also be leveled by this means, or tilted slightly, in case the layer of glass supplied over the feed roll should be thicker at one side than at the other. Two end blocks 33 (Fig. 3) define the vertical width of the slot 4, and may be adjusted in and out to define the width of the glass sheet. Rods 34 serve to clamp the metal frames 26 and 29 together and to support the frame 26 from the frame 29. When it is necessary to replace the cover members, or the front wall of the pot, the water cooled gate 30 is positioned, as indicated in dotted lines in Fig. 1, thus cutting off the pot from the chamber 2, after which the frame 16, and the parts carried thereby, including the cover of the pot, may be removed bodily by the crane to which the chains 23a are attached.

The pot and flue chambers therebeneath are supported by a framework 35 which may be adjusted up and down and leveled by means of four screw jacks 36.

The feed roll 6 is provided at its ends with swivels 37 and suitable water circulating connections (Fig. 4), and is driven independently of the sizing rolls 7 and 8 from the motor 38 through the intermediary of the tumbler shafts 39 and suitable reduction gearing in the casings 40 and 41. The bearings 42, 42 of this roll are independently adjustable by means of the screws 43 which extend through nuts and are provided with worm wheels 44 (Fig. 1) meshing with worms 45 on shafts having the handles 46. This permits the roll to be adjusted vertically, and also permits it to be tilted slightly in case the layer of glass passing over the roll becomes thicker at one side of the roll than at the other. This condition may arise if the layer of glass supplied to the roll is not of uniform temperature across the width of the pot. The adjusting devices for the roll 6, as well as those for the sizing rolls 7 and 8, are carried on a truck 47 running on the rails 48 which permits the apparatus to be removed laterally from the front of tthe draw pot for the purpose of replacement or repair.

The sizing rolls 7 and 8 are provided at their ends with swivels 49 and suitable air circulating connections, as shown in Fig. 5. They are driven at the same rate of speed from the vertical shafts 50 and 51 through the intermediary of worm drives 52 and 53 and the tumbler shafts 54. The shafts 50 and 51 are driven from the horizontal shafts 55 and 56 by means of the pairs of bevel gears 57 and 58. The shafts 55 and 56 have intermeshing spur gears 59 and 60, and the shaft 55 is driven by the same motor which drives the apron rolls 9 and the rolls in the leer 10. The apron and leer rolls are provided at their ends with sprockets around which pass suitable driving connections therefor being well known in the art, and forming no part of the present invention. The bearings carrying the rolls 8 and 9 are mounted for vertical adjustment in the housings 61, and adjustment is accomplished by means of screw shafts 62, 62 which work through nuts 63 swiveled in the top of the truck 47. These nuts are in the form of worm wheels which are engaged by worms on a transverse shaft 64 having a handle 65 (Fig. 5). By operating the handle, the rolls may be adjusted vertically so that their pass lies at the proper level with respect to the feed roll 6. Vertical screw shafts 66 engaging the bearings of the upper roll 8, serve to adjust the pressure between the rolls 7 and 8, the usual spring 67 being interposed between the ends of the shafts and the bearings.

The lip member 28 is preferably provided with a sheath of metal 68 which is resistant to the action of the highly heated glass. The metal best suited is platinum or a platinum rhodium composition containing about 10 per cent of rhodium, as these metals are particularly inert to the action of highly heated glass. A lip thus protected will last several times as long as a clay lip which is unprotected, so that loss incident to shutdown and replacements is largely reduced. There is also practically no reaction between the metal and the glass so that the small bubbles which are incorporated into the lower surface of the sheet, when a lip of clay or other refractory is used, are avoided as well as any small stones which sometimes come from a clay lip. There is also less tendency to trap air into the sheet between the forward edge of the lip and the roll, as is the case with a clay lip, particularly after such clay lip becomes roughened at this point. The metal sheath in opposition to the surface of the roll 4 remains smooth, and little or no air works into the sheet at this point during the rolling operation.

In order to hold the metal sheath smooth under varying temperature conditions, means are provided for tensioning it longitudinally of the lip and also transversely thereof. The transverse tensioning is accomplished by a pair of split rods 69 and 70 (Fig. 7) between which the edges of the sheet 68 are clamped. These rods are provided with the arms 71 and 72. The arm 72 is swung to rotate the rod 70 by means of the set screw 73, while the arm 71 is swung by the rod 74, thus rotating the rod 69. The rod 74 extends through a bracket 75 and its threaded end carries a nut 76 for moving it endwise. The sheath is tensioned longitudinally of the lip by the rods 79 (Fig. 8) brazed at their inner ends to the edges of the sheath lying outside the wall of the pot. The outer ends of these rods extend through a bracket 80 carried by the rod 81, and such bracket is adjusted outward by the turnbuckle 82 anchored at its inner end in the wall of the pot. One of these adjusting devices is used at each end of the sheath, and their adjustment serves to tighten the sheath along the length of the lip.

In order to regulate the temperature of the glass, the pipes 83 and water coolers 84 may be employed either together or separately. The pipes 83 are perforated along their lower sides, air being supplied thereto under pressure. The coolers 84 are in the form of flat boxes provided with suitable connections for circulating water therethrough. Another water cooler 85 may also be used adjacent the sizing roll 8 for cooling its surface. This cooler, in addition to cooling the roll, exercises a cooling effect on the surface of the glass passing therebeneath. As an additonal cooling means for the rolls 7 and 8 the three sets of perforated pipes 86 are provided extending along the roll and partially surrounded by the shields 87. Air is supplied under pressure to these pipes.

In operation, the feed roll 6, whose drive is independent of the drive of the sizing rolls 7 and 8, is driven at a lower rate of speed than the sizing rolls, so that the sheet between the feed and sizing rolls has an opportunity to stretch and thin before it passes through the sizing rolls. The relative speed of rotation of the feed and sizing rolls is so regulated that a bulb or roll of glass is formed and maintained at the entrance to the pass between the sizing rolls, as indicated at 88 in Fig. 9. The skin of cold glass at this point is unbroken and has a movement as indicated by the arrows. The maintenance of this bulb or roll is important, as it insures that the pass between the sizing rolls will always be completely filled from end to end. Any deficiency in the supply of glass along the length of the pass will be supplied by an endwise flow in the bulb, and as a result, the sheet issuing from the pass has the same uniformity of thickness from edge to edge which exists when glass is fed to the pass of a pair of sizing rolls under the head pressure of the glass in a tank, as has been the most common practice in producing plate glass continuously from a tank. The absence of a supporting runway or roll between the feed and sizing rolls is of marked advantage as it permits the more ready thinning of the sheet by stretching and prevents the bottom skin of the sheet from being unduly cooled. Too much cooling of such skin interferes with the sizing of the sheet as it passes between the sizing rolls. The absence of a supporting roll or runway between the feed and sizing rolls also permits such rolls to be placed closer together, thus reducing the cooling of the bottom skin of the sheet.

Fig. 10 illustrates a modification in which the feed roll 89 is placed below the lip 90, and the pass between the sizing rolls 91 and 92 is placed at a level substantially below the top of the feed roll. This is not as desirable an arrangement as the one heretofore described, but can be used to advantage under certain conditions. The method of operation, including the maintenance of the bulb or roll of glass at the entrance of the pass between the sizing rolls, is the same as heretofore described.

Fig. 11 involves a still further modification, in which a series of feed rolls 93, 94 and 95 are substituted for the single feed roll, such feed rolls being located below the level of the lip 96, as in the Fig. 11 construction. The sizing rolls 97 and 98 and the method of operation are the same as with the other constructions.

What we claim is:

1. A process of making plate glass, which consists in continuously supplying a layer of molten glass of substantially uniform thickness over a supply or feed roll which chills the glass as it passes thereover, conducting the sheet thus formed laterally between a pair of sizing rolls without support intermediate the supply roll and sizing rolls so that the sheet sags and stretches, and regulating the relative speed of rotation of the feed and sizing rolls so that a bulb of plastic glass is constantly maintained at the entrance of the pass between the sizing rolls.

2. A process of making plate glass, which consists in continuously supplying a layer of molten glass of substantially uniform thickness over a supply or feed roll which chills the glass as it passes thereover, conducting the sheet thus formed laterally between a pair of sizing rolls, permitting the sheet to sag and stretch between the feed roll and the sizing rolls, and regulating the relative speed of rotation of the feed and sizing rolls so that a bulb of plastic glass is constantly maintained at the entrance of the pass between the sizing rolls.

3. A process of making plate glass, which consists in continuously conducting a layer of glass laterally over a supply or feed roll from a body of molten glass in a container, applying temperature regulating means to the body of glass so that said layer of glass leaves the tank at substantially uniform temperature from edge to edge, conducting the sheet thus formed laterally between a pair of sizing rolls without support intermediate the supply roll and sizing rolls so that the sheet sags and stretches, and regulating the relative speed of rotation of the feed and sizing rolls, so that a bulb of plastic glass is constantly maintained at the entrance of the pass between the sizing rolls.

4. A process of making plate glass which consists in continuously supplying a layer of molten glass from a tank over an outlet lip member to a feeding roll member which chills the glass as it passes thereover, conducting the sheet thus formed laterally between a pair of sizing rolls, and during the rolling operation tilting one of said members in such manner as to maintain the layer of glass passing thereover at substantially the same thickness from side to side.

5. A process of making plate glass which consists in continuously supplying a layer of molten glass from a tank over an outlet lip member to a feeding roll member which chills the glass as it passes thereover, conducting the sheet thus formed laterally between a pair of sizing rolls, and during the rolling operating tilting the feed roll member in such manner as to maintain the layer of glass passing thereover at substantially the same thickness from side to side.

6. A process of making plate glass which consists in continuously supplying a layer of molten glass from a tank over an outlet lip member to a feeding roll member which chills the glass as it passes thereover, conducting the sheet thus formed laterally between a pair of sizing rolls, and during the rolling operation tilting the outlet lip member in such manner as to maintain the layer of glass passing thereover at substantially the same thickness from side to side.

FREDERICK GELSTHARP.
WALTER G. KOUPAL.